United States Patent [19]
Snell et al.

[11] Patent Number: 5,647,464
[45] Date of Patent: Jul. 15, 1997

[54] RELEASABLE LOCK MECHANISM FOR GEAR SHIFT LEVER

[75] Inventors: William M. Snell, Grand Blanc; Thomas S. Kaliszewski, Troy; Rodney L. Eaton, Clarkston, all of Mich.

[73] Assignee: Chrysler Corporation, Auburn Hills, Mich.

[21] Appl. No.: 573,830

[22] Filed: Dec. 18, 1995

[51] Int. Cl.$^6$ ............................ B60K 41/26; B60K 41/28
[52] U.S. Cl. ........................ 192/4 A; 74/483 R; 477/96
[58] Field of Search ................. 74/483 R; 192/4 A; 477/96

[56] References Cited

U.S. PATENT DOCUMENTS

| | | | |
|---|---|---|---|
| 4,096,930 | 6/1978 | Viscardi | 192/4 A |
| 4,919,242 | 4/1990 | Muramatsu et al. | 192/4 A |
| 4,938,042 | 7/1990 | Muramatsu | 192/4 A X |
| 4,986,399 | 1/1991 | Gokee | 192/4 A |
| 4,991,700 | 2/1991 | Koga | 192/4 A |
| 5,003,799 | 4/1991 | Imai et al. | 192/4 A X |

Primary Examiner—Allan D. Herrmann
Attorney, Agent, or Firm—Edward A. Craig

[57] ABSTRACT

A gear shift lever can be moved to several "Drive" positions and to a "Park" position. A retainer holds the lever in the "Park" position. An operator is provided to retract the retainer so that the lever may be shifted out of "Park". A lock prevents the retraction of the lever retainer until the brake pedal is depressed. A mechanical connection between the brake pedal and the lock retracts the lock away from its locking position when the brake pedal is depressed.

7 Claims, 6 Drawing Sheets

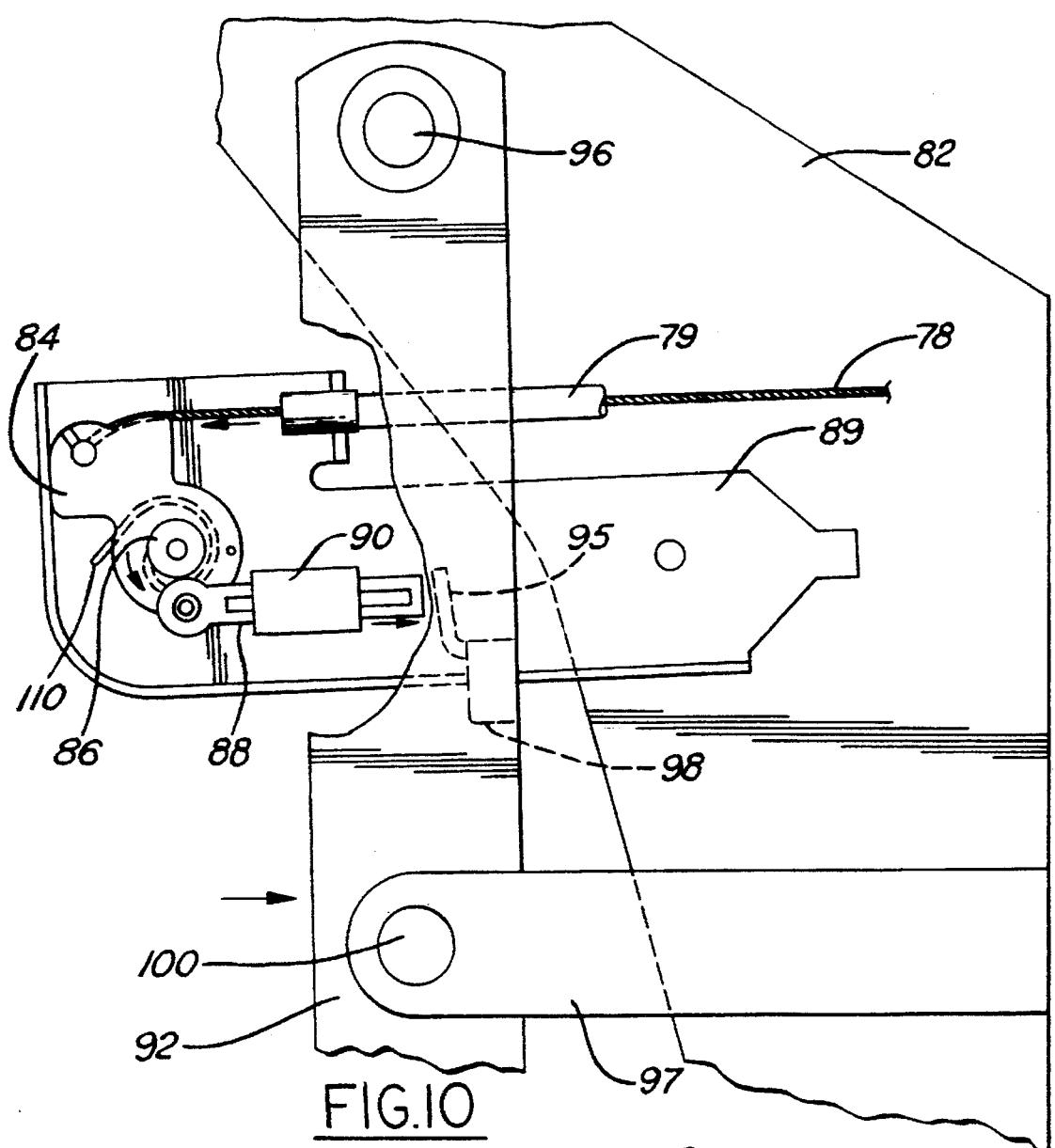
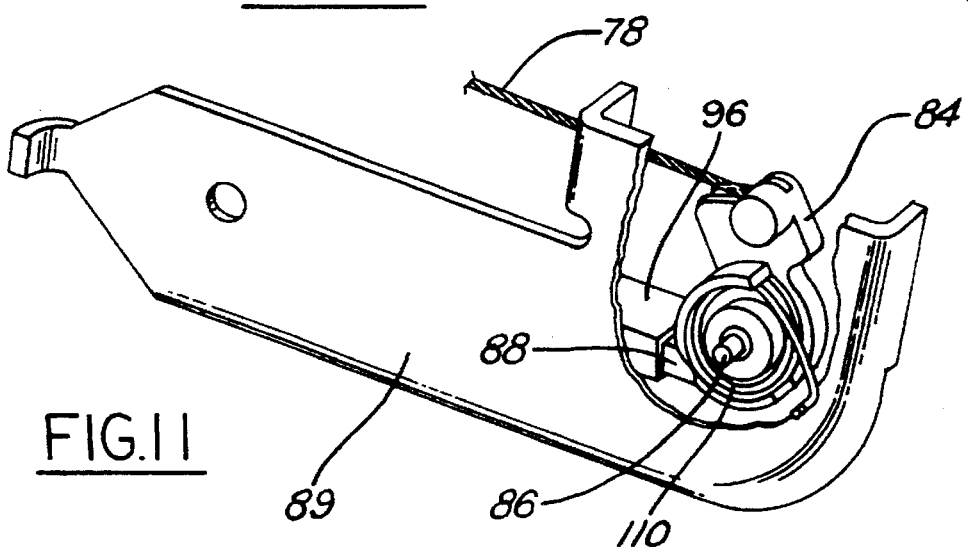

RELEASABLE LOCK MECHANISM FOR GEAR SHIFT LEVER

FIELD OF INVENTION

This invention relates generally to a releasable lock mechanism for the gear shift lever of an automotive vehicle and more particularly to a brake pedal actuated release for the lock mechanism.

BACKGROUND AND SUMMARY

The conventional gear shift lever for an automatic transmission of an automotive vehicle has a "Park" position. It is common practice to place the gear shift lever in the "Park" position when turning off the engine. For reasons of safety, it is recommended that the operator depress the brake pedal and at least lightly apply the brakes when starting the engine and shifting out of "Park". What is needed is a simple and effective mechanical system for locking the gear shift lever in the "Park" position and for releasing the lock on the gear shift lever to enable shifting out of "Park" by depressing the brake pedal.

In accordance with the present invention, a gear shift lever retainer is mounted on the gear shift lever for movement to an advanced position in which it is engageable with a "Park" detent to prevent movement of the gear shift lever out of "Park". A lock is movable toward and away from a locking position in which it locks the retainer in the advanced position. A mechanical connection is provided between the brake pedal arm and the lock for moving the lock away from its locking position when the brake pedal arm is moved toward brake-applying position, thereby releasing the lever retainer so that it may be retracted and the gear shift lever shifted out of "Park".

The mechanical connection preferably comprises a cable connected to one end of a pivotally mounted cable retractor. The cable retractor retracts the cable in response to movement of the brake pedal arm toward its brake-applying position. A spring is provided for the cable retractor. The spring, when the brake pedal is in the brake-release position, causes the retractor to advance the cable and move the lock to its locking position.

One object of this invention is to provide a releasable lock mechanism as described above, having the foregoing features and capabilities.

Another object is to provide a releasable lock mechanism which is mechanical in structure, and composed of a relatively few simple parts, is rugged and durable in use, and is capable of being inexpensively and readily manufactured and assembled.

These and other objects, features and advantages of the invention will become more apparent as the following description proceeds, especially when considered with the accompanying drawings.

BRIEF DESCRIPTION OF THE DRAWINGS

FIG. 10 is a view similar to FIG. 9 but shows the parts in a different position.

FIG. 11 is a fragmentary perspective view looking in the direction of the arrow 11 in FIG. 1.

DETAILED DESCRIPTION OF THE PREFERRED EMBODIMENT

Referring now more particularly to the drawings, the gear shift lever assembly 12 is shown mounted centrally of the forward compartment 10 of a vehicle on a brake pedal assembly 14 mounted on the opposite side of the frame 13. The gear shift lever assembly 12 preferably is located for operation by the right hand of the driver and the brake pedal assembly 14 is located for operation by the foot of the driver.

Figure 2:
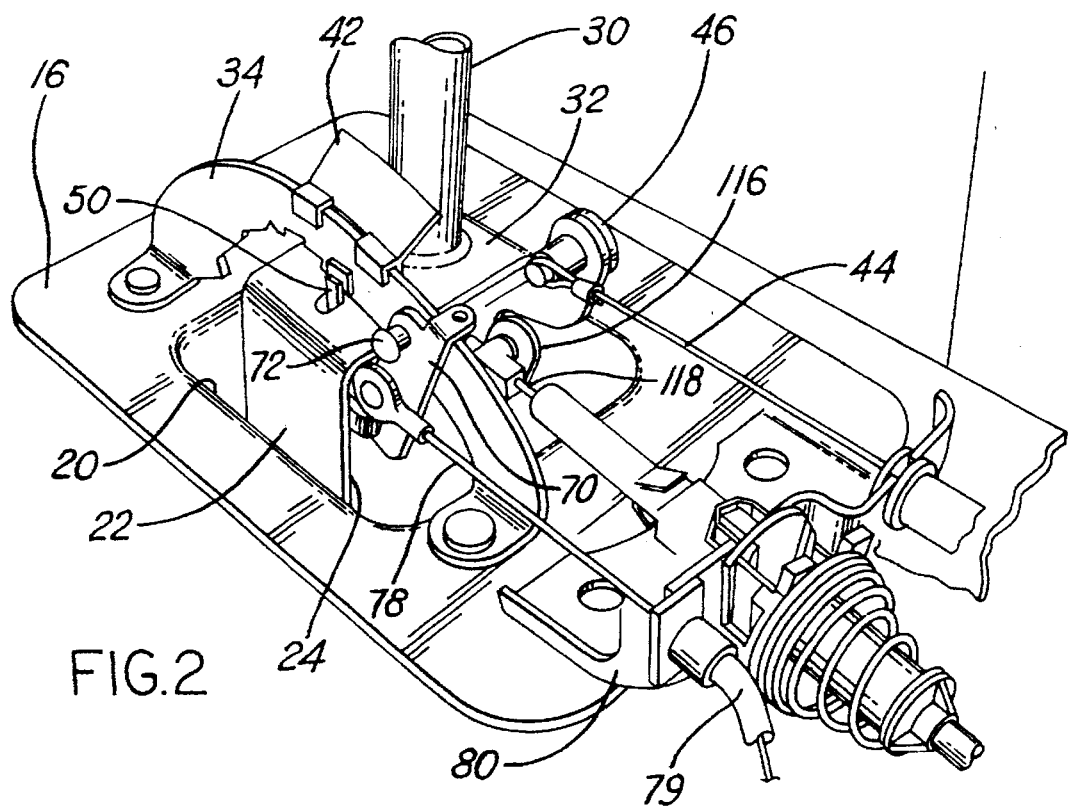
FIG. 2 is a perspective view showing part of the gear shift assembly.

The gear shift lever assembly 12 comprises a generally horizontal mounting plate 16 (FIG. 2) which is bolted to the frame 13. The plate 16 has a rectangular central depression 20. A channel 22 of inverted generally U-shape has its side flanges 24 pivoted to the side walls of the depression by aligned horizontal pivot pins 26 which extend transversely of the vehicle. An elongated, generally vertical gear shift lever 30 has its lower end secured to the base 32 of the channel 22 so that the lever may be pivoted forwardly and rearwardly about pivot pins 26.

A shift gate 34 has its opposite ends secured to the top of plate 16 at the front and rear of the depression 20, adjacent to the gear shift lever 30. The shift gate 34 is an elongated metal strip that extends from end to end in an arc and has detents 38 and 40 spaced apart along its bottom edge. The detents 38 correspond to certain "Drive" gear shift positions of the transmission for driving the vehicle in forward and reverse, and also for placing the transmission in neutral. The detent 40 corresponds to the "Park" gear shift position. The detent 40 is in the form of a slot provided by a clip 42 snapped on the shift gate. The gear shift lever 30 pivots in a plane parallel to the length of the shift gate.

A cable 44 has one end attached to an arm 46 (FIG. 2) on the channel 22 of the gear shift lever and extends to the engine transmission (not shown) so that the movement of the gear shift lever shifts the transmission.

The gear shift lever 30 has a lever retainer 50 which cooperates with the detents 38 and 40 in holding the lever 30 in a desired position (FIGS. 3–7). The retainer 50 is formed near the bottom of an elongated rod 52 which is mounted for reciprocation in a passage extending lengthwise within the gear shift lever 30. A tension coil spring 53 has one end attached to the channel 22 and the other end attached to rod 52, urging the rod upwardly for engagement of the retainer 50 in any one of the detents 38,40.

Figure 8:
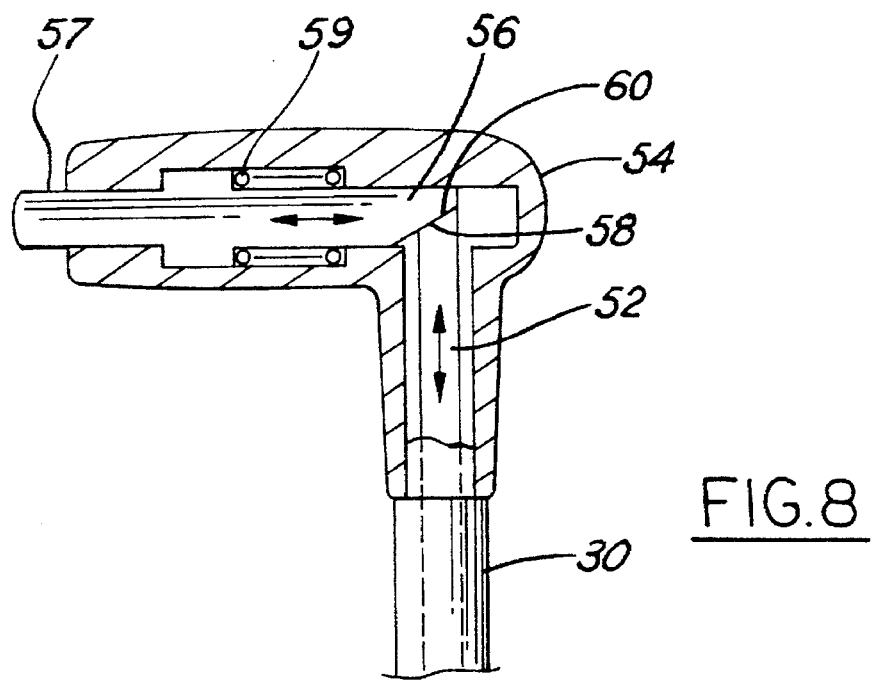
FIG. 8 is a fragmentary sectional view of the upper end portion of the gear shift lever.

Referring to FIG. 8, the gear shift lever 30 has a transverse handle 54 at the upper end. A cross rod 56 reciprocates within a passage in the handle 54 and has a beveled end 58 engaged with a similarly beveled end 60 on the upper end of rod 52. The cross rod 56 has a button 57 on the other end which is exposed so that the driver may press the button inwardly against the pressure of spring 59 and thereby cause the cross rod 56 to push rod 52 downwardly to withdraw the retainer 50 from engagement with the detents on the shift gate. The cross rod 56 thus serves as an operator for use in releasing the gear shift lever.

A lock 70 is provided to prevent the lever retainer from being unintentionally disengaged from the "Park" detent. The lock 70 is in the form of a lever having one end pivoted at 72 to the shift gate 34. The opposite end portion of the lock 70 has a recess 74. The recess 74 is adapted to receive a hook or catch 76 on the lever retainer 50. The lock 70 can be pivoted to a lock position (FIG. 3) in which its recess 74 can receive the catch when the lever retainer 50 is engaged in the "Park" detent, and to a withdrawn position (FIGS. 4 and 5) to retract the lock recess away from the catch.

Figure 9:
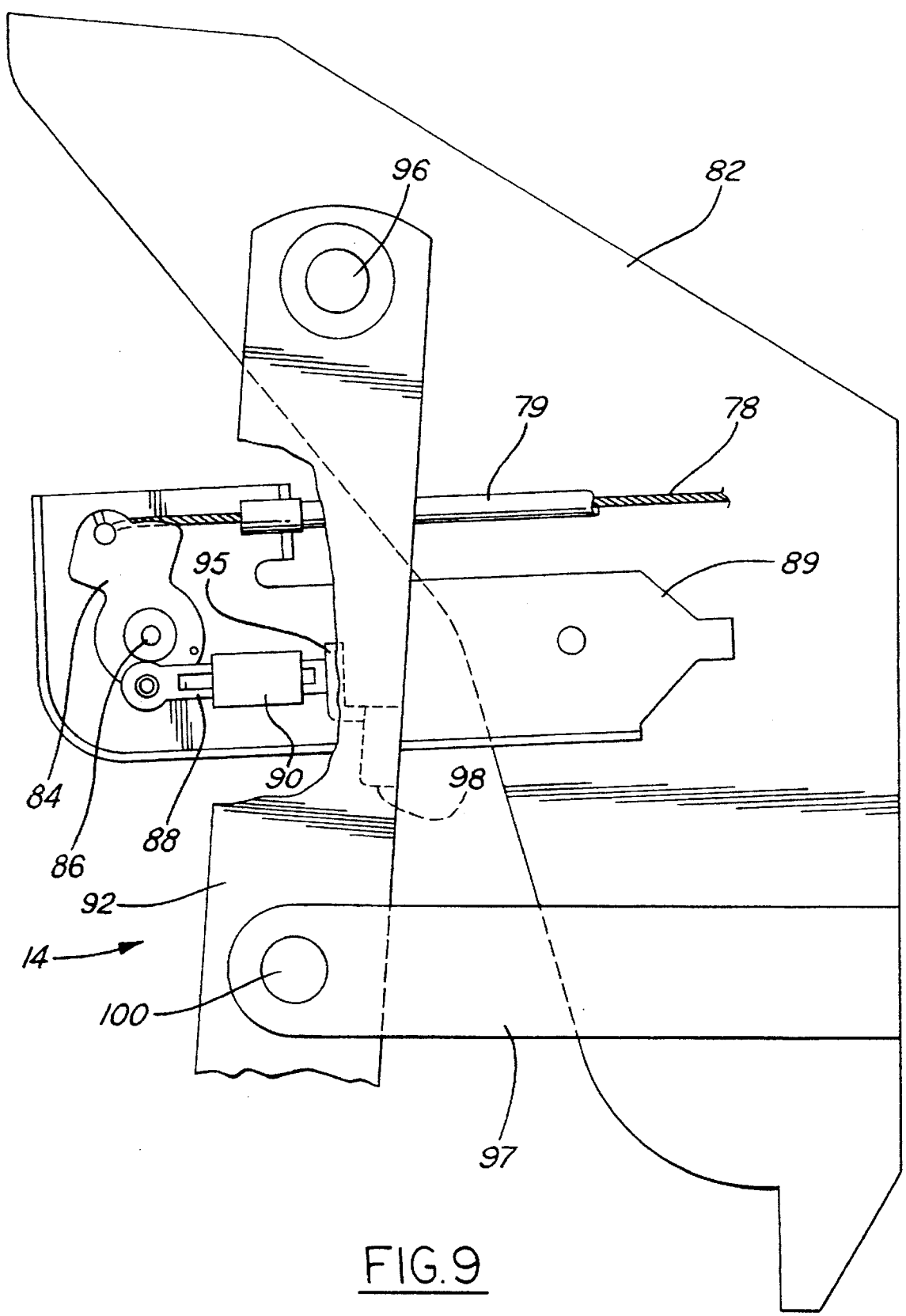
FIG. 9 is a view taken on the line 9—9 in FIG. 1.

An elongated flexible cable 78 is provided to move the lock 70 between its lock position and its withdrawn position. The cable 78 is sheathed in a flexible tube 79 having one end secured to a bracket 80 mounted on the plate 16 and the other end mounted on a housing 82 carried by the frame 13. One end of the cable 78 is attached to the lock 70 near the lock recess 74. The other end of the cable 78 is attached to one end of a cable retractor lever 84 (FIGS. 9,10). The cable retractor lever 84 is pivoted between its ends on a pin 86, and a horizontal bar 88 pivoted to the opposite end of lever 84 slides in a horizontal guide 90. The pivot pin 86 and guide 90 are carried by a plate 89 mounted on housing 82.

Figure 1:
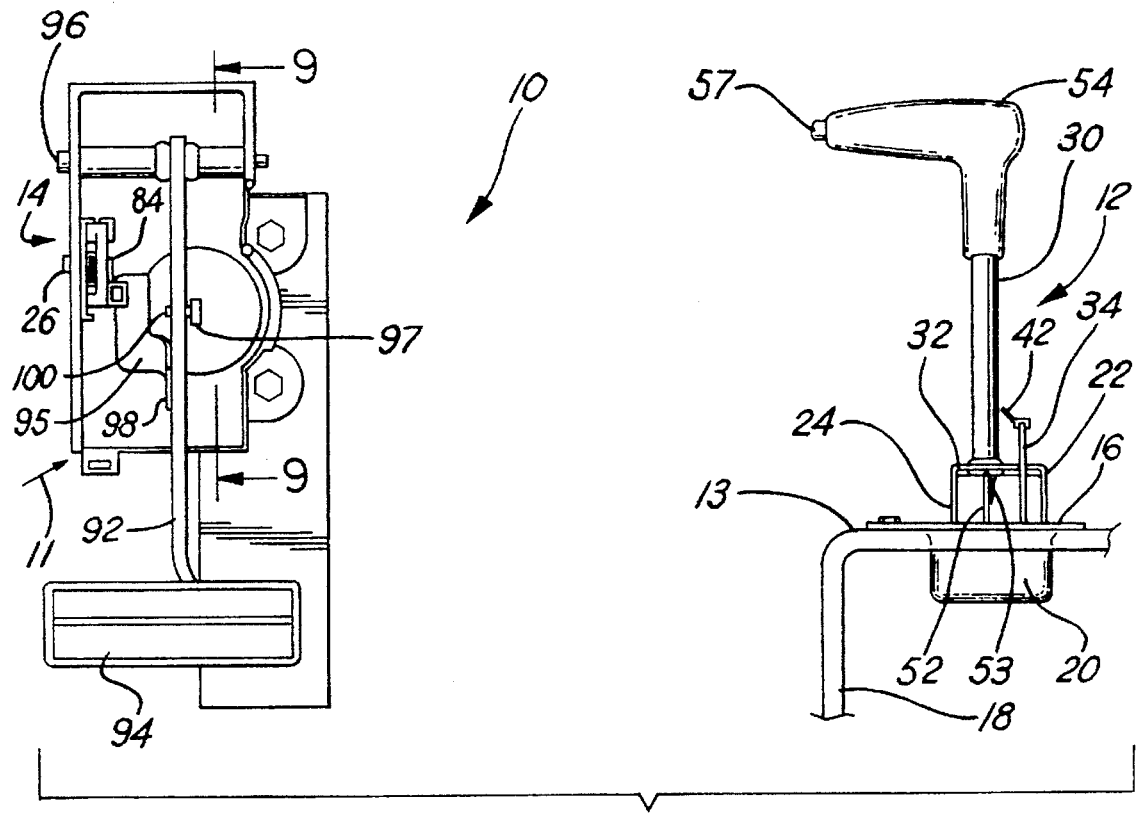
FIG. 1 is an elevational view showing the gear shift assembly and brake pedal, constructed in accordance with the present invention.

The brake pedal assembly 14 has an elongated, generally vertical brake arm 92 with a foot pedal 94 at the lower end. The upper end of arm 92 turns on a horizontal transverse pivot 96 mounted on housing 82. A brake booster arm 97 (FIG. 1) extending through housing 82 has a pin 100 which is pivotably connected to the arm 92 and urges it rearwardly. The brake booster arm 97 limits the rearward pivotal movement of the arm 92, stopping movement at the point where the arm reaches its brake-release position.

The brake arm 92 may be pivoted forwardly by pressing on the foot pedal 94 to move the arm to a brake-applying position (FIG. 10) and apply the vehicle brakes (not shown). A bracket 98 on brake arm 92 has an extension 95. The extension 95, when the brake arm is pivoted rearwardly to its release position, engages the bar 88 and turns the retractor 84 clockwise to the FIG. 9 position. This movement of the retractor 84 advances the cable and pushes the lock 70 to its locking position. When the brake arm is pivoted forwardly to its brake-applying position (FIG. 10), it disengages the bar 88 so that the retractor 84 can be turned counterclockwise by a coil spring 110 (FIG. 11). Counterclockwise movement of the retractor 84 retracts the cable 78 and pulls the lock 70 away from its locking position.

Figure 3:
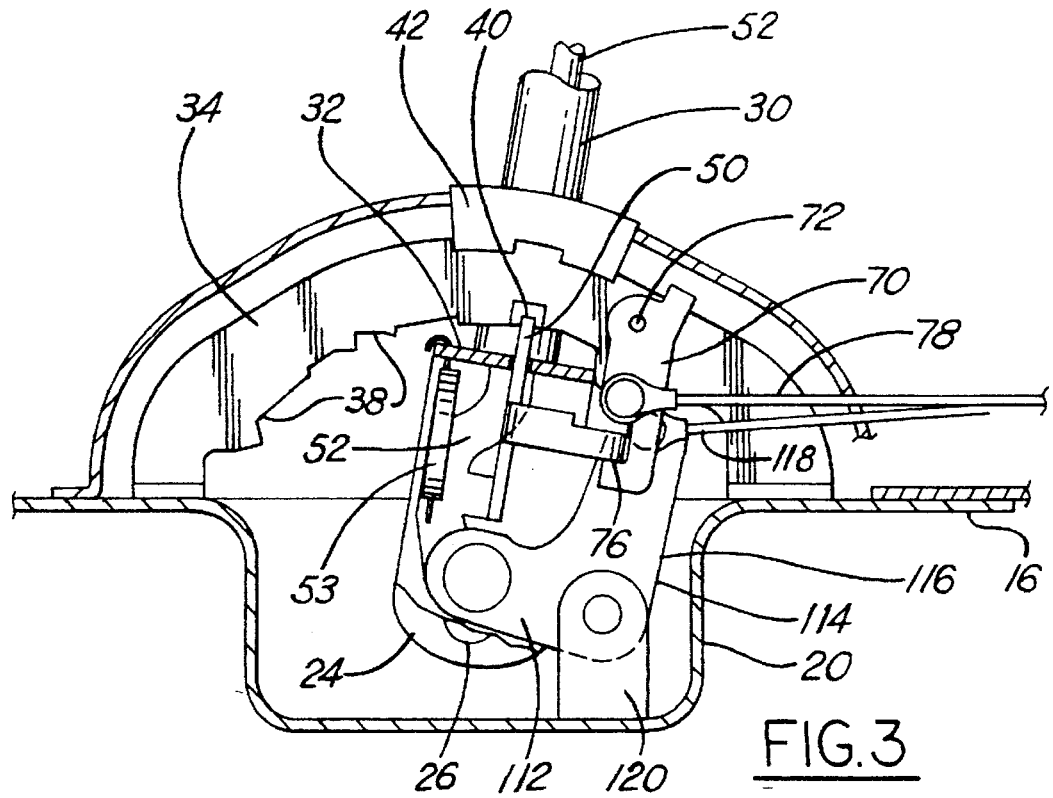
FIG. 3 is a sectional view showing the gear shift lever locked in the "Park" position.
Figure 4:
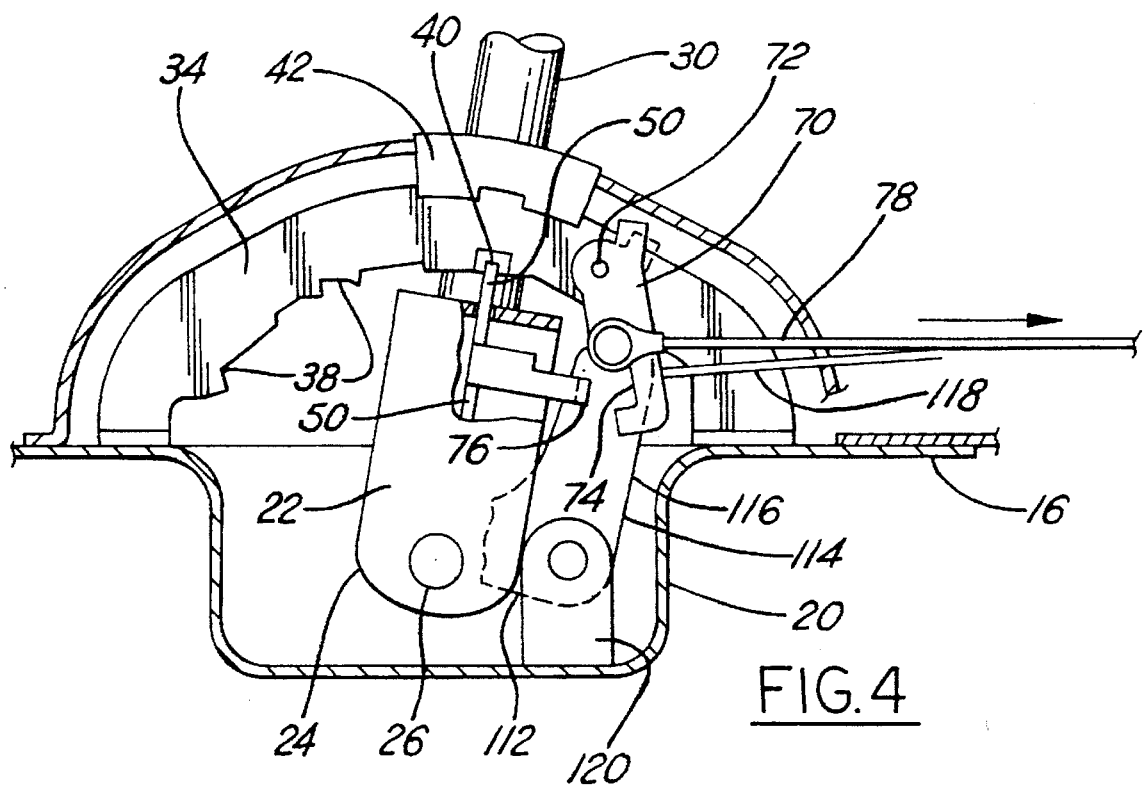
FIG. 4 is a view similar to FIG. 3, but shows the lock withdrawn to permit the withdrawal of the shift lever retainer from the "Park" detent so that the gear shift lever may be shifted to another position.
Figure 5:
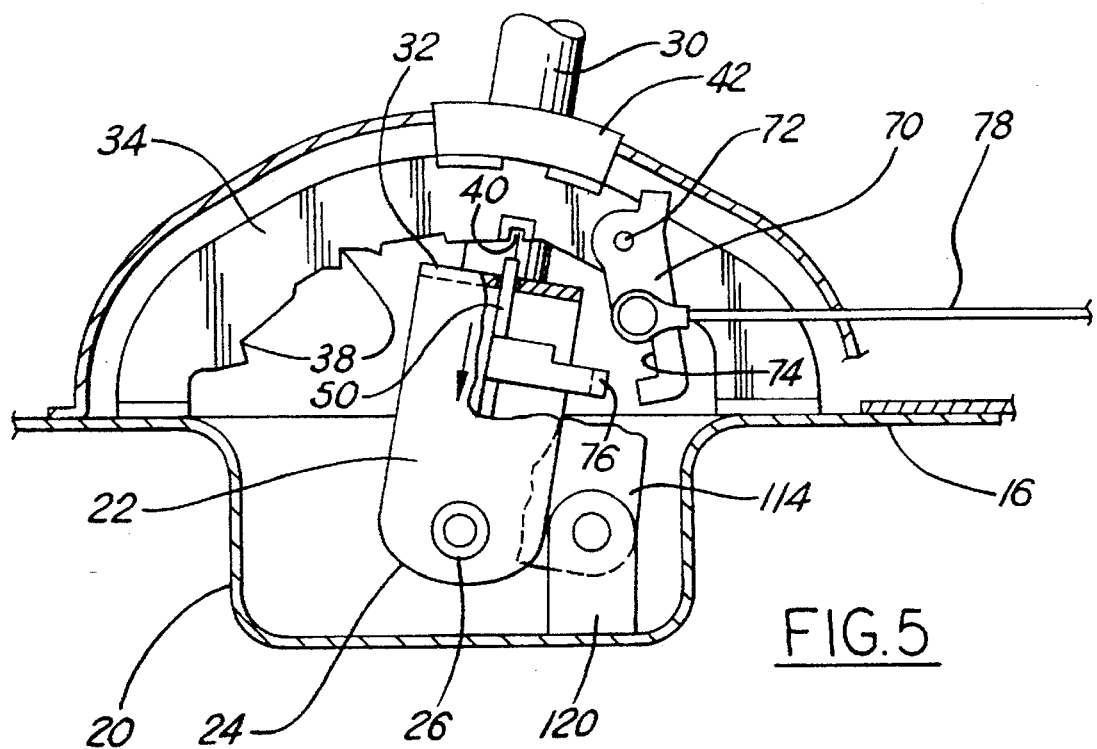
FIG. 5 is similar to FIGS. 3 and 4, but shows the gear shift lever retainer withdrawn from the "Park" detent.

The lower end of the rod 52 is pivoted to the outer end of an arm 112 of a bell crank 114 (FIG. 3). The outer end of the other arm 116 of the bell crank 114 is pivoted to one end of a cable 118. The bell crank 114 is pivoted between its ends to a bracket 120 mounted on the bottom wall of the depression 20. When the rod 52 is lowered by pressing on the button 57, the bell crank 114 is pivoted counterclockwise pulling on the cable 118 and tending to retract it. However, the opposite end of the cable 118 is attached to the ignition (not shown) which prevents the cable 118 from being retracted when the ignition is switched to the "off" position. Therefore, when the ignition is switched to "off" and the cable 118 cannot be retracted, the rod 52 cannot be moved downward to disengage the lever retainer 50 from the "Park" detent. However, when the ignition is turned on to start the engine, the cable 118 is released by the ignition so that the cable 118 can be retracted and the rod 52 permitted to move downward to disengage the retainer 50 from the "Park" detent. This ignition feature may, if desired, be incorporated in the system but is not part of the invention.

In use, when the ignition is turned on, this releases the cable 118 so that it is free to be retracted and therefore incapable of preventing the downward movement of the rod 52 to withdraw the retainer 50 from the "Park" detent. However, before the rod 52 can be moved downwardly by operation of the push button 57, the lock 70 must be withdrawn to disengage the catch 76 on the rod 52. This is accomplished by pressing on the foot pedal 94 to turn the brake arm 92 counterclockwise toward its brake-applying position in FIG. 10, disengaging the bar 88 from the brake arm and allowing the cable retractor 84 to be turned counterclockwise by the spring 110 in a direction to pull on the cable 78 and withdraw the lock 70 to the FIG. 4 position.

Figure 6:
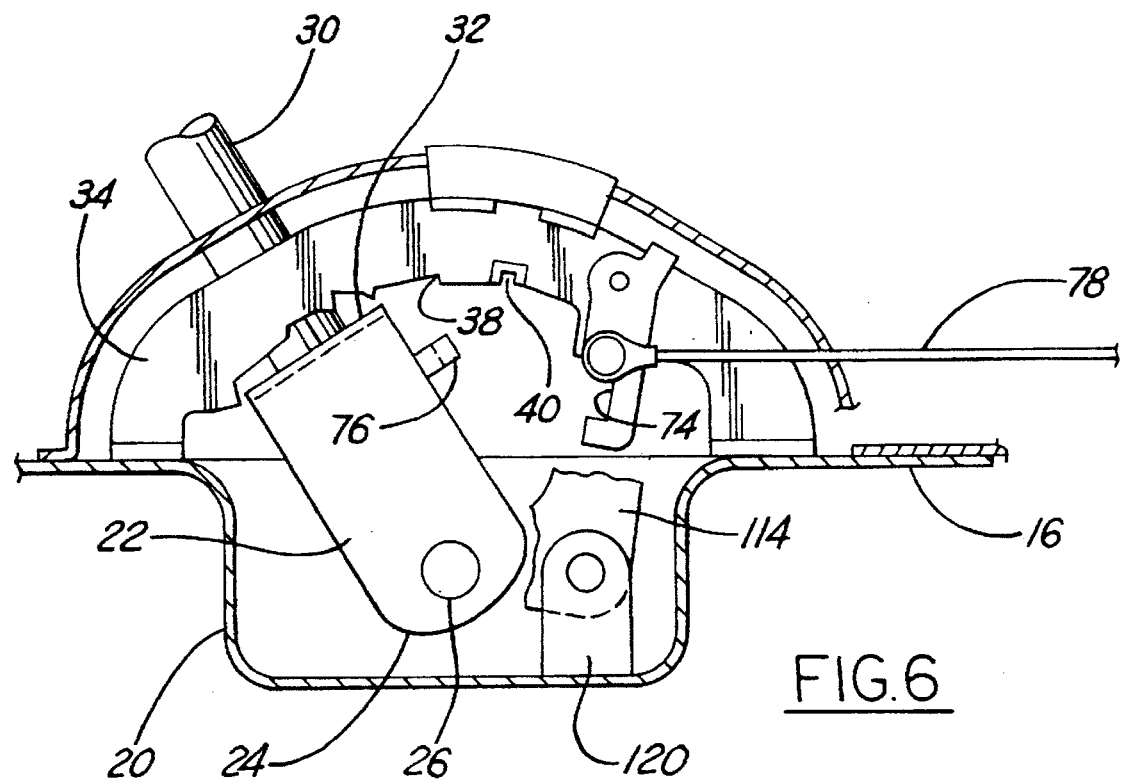
FIG. 6 is similar to FIGS. 3–5, but shows the gear shift lever moved into a different position.
Figure 7:
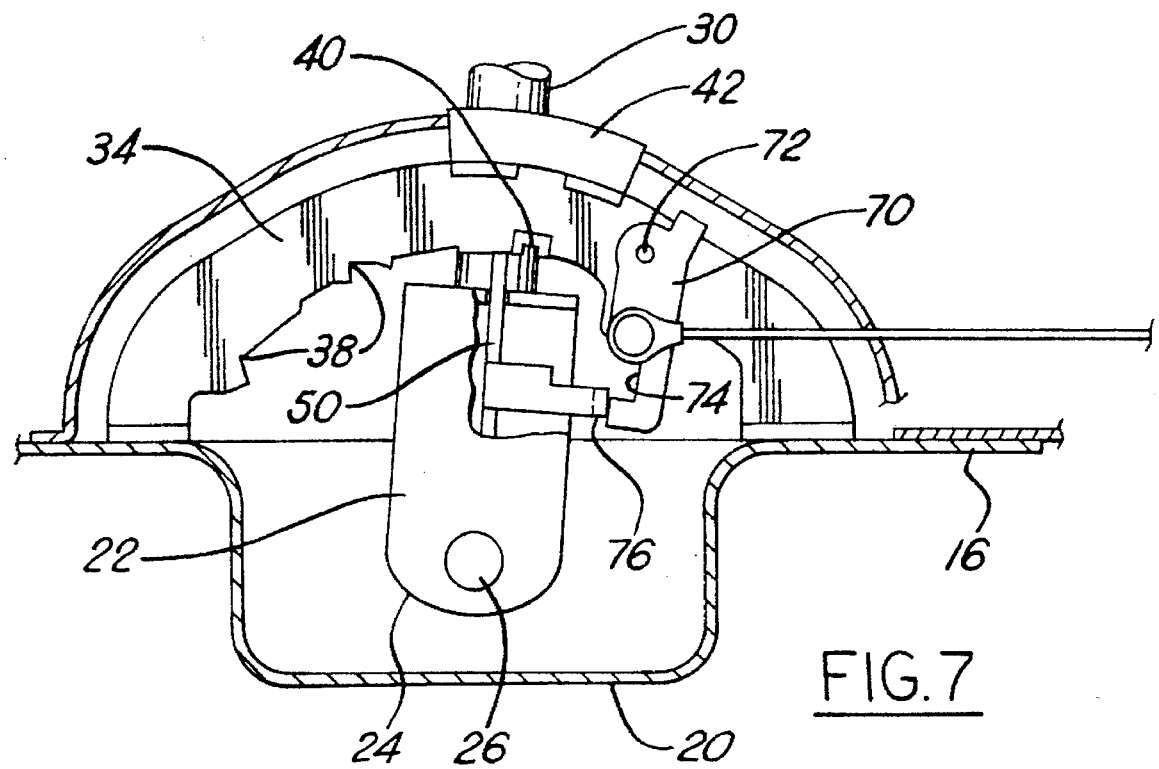
FIG. 7 is similar to FIGS. 3–6, but shows the gear shift lever swung back towards the "Park" position when it initially engages the lock to cam it out of the way.

When it is desired to stop the vehicle and place the gear shift lever 30 in "Park", the gear shift lever is pivoted clockwise from the FIG. 6 position to the FIG. 7 position in which the catch 76 on the lever retainer 50 engages the lock 70 at a point beneath the lock recess 74 to cam the lock 70 counterclockwise and permit further pivotal movement of the gear shift lever to the FIG. 3 position in which the lever retainer 50 snaps into the "Park" detent 40 and the catch 76 snaps into the recess 74 of lock 70. The gear shift lever 30 may be moved forward to the "Park" position without the need to depress the brake pedal.

What is claimed is:

1. Releasable lock mechanism for the gear shift assembly of an automotive vehicle comprising:

a gear shift lever, means mounting said gear shift lever for movement to a plurality of "Drive" positions and to a "Park" position, a shift gate, means mounting said shift gate adjacent to said gear shift lever, said shift gate having a plurality of "Drive" detents and a "Park" detent corresponding to the "Drive" and "Park" positions of said gear shift lever, a lever retainer mounted on said gear shift lever for movement toward and away from an advanced position and when in said advanced position being engageable with any one of said detents, said lever retainer when in said advanced position in engagement with said "Park" detent preventing movement of said gear shift lever, means urging said lever retainer toward its advanced position, an operator on said gear shift lever for retracting said lever retainer away from said advanced position to thereby release said gear shift lever when in the "Park" position, a lock mounted for movement toward and away from a locking position, said lever retainer having a catch engageable by said lock when said lock is in its locking position and said gear shift lever is in its "Park" position and said lever retainer is in its advanced position engaged in the "Park" detent to prevent retraction of said lever retainer, a brake arm movable between a brake-release position and a brake-applying position, a mechanical connection between said brake arm and said lock for retracting said lock away from its locking position when said brake arm is moved toward said brake-applying position to disengage and release said catch and permit said lever retainer to be retracted away from its advanced position by said operator, said mechanical connection comprising a cable, means connecting one end of said cable to said lock, means connected to the other end of said cable for retracting said cable and in turn retracting said lock in response to movement of said brake arm toward said brake-applying position, said means for retracting said cable comprising a cable retractor connected to said other end of said cable, means mounting said cable retractor for movement toward and away from a cable retracting position, said brake arm moving said cable retractor away from said cable retracting position in the brake-release position of said brake arm and releasing said cable retractor in the brake-applying position of said brake arm, and means for moving said cable retractor to its cable retracting position when said brake arm is moved toward its brake-applying position.

2. Releasable lock mechanism as defined in claim 1, wherein said means for retracting said cable retractor comprises a spring, and said cable retractor comprises a pivotally mounted cable retractor lever.

3. Releasable lock mechanism as defined in claim 2, wherein said cable retractor lever has first and second ends and is pivotally mounted between said ends, said other end of said cable is connected to said first end of said cable retractor lever, said spring urging said cable retractor lever in one direction and said brake arm when moved toward brake-applying position permitting turning of said cable retractor lever in said one direction by said spring.

4. Releasable lock mechanism as defined in claim 3, wherein said cable retractor lever, when said brake arm is in the brake-release position, is moved in the opposite direction by said brake arm to advance said cable and move said lock to its locking position.

5. Releasable lock mechanism as defined in claim 4, wherein said lock comprises a pivotally mounted member having a recess, and said catch is adapted to be received in said recess.

6. Releasable lock mechanism as defined in claim 1, wherein said means for retracting said cable retractor comprises a spring.

7. Releasable lock mechanism as defined in claim 1, wherein said cable retractor comprises a pivotally mounted cable retractor lever.

* * * * *